United States Patent

Roesser et al.

[11] Patent Number: 6,107,371
[45] Date of Patent: Aug. 22, 2000

[54] BIODEGRADABLE EXPANDED STARCH PRODUCTS AND THE METHOD OF PREPARATION

[75] Inventors: David S. Roesser, Frenchtown; John Nevling, Gladstone; David C. Rawlins, Piscataway; Robert L. Billmers, Stockton, all of N.J.

[73] Assignee: National Starch and Chemical Investment Holding Corporation, Wilmington, Del.

[21] Appl. No.: 09/097,859

[22] Filed: Jun. 16, 1998

[51] Int. Cl.[7] .............................. B27M 3/00; B27N 5/02; B29D 22/00; C08J 3/00; C08L 89/00
[52] U.S. Cl. .............................. 524/47; 264/53; 428/35.6; 428/36.5; 521/79; 521/84.1
[58] Field of Search .............................. 524/47; 428/35.6, 428/36.5; 264/53; 521/79, 84.1

[56] References Cited

U.S. PATENT DOCUMENTS

| | | | |
|---|---|---|---|
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |
| 5,393,804 | 2/1995 | George et al. | 523/128 |
| 5,512,090 | 4/1996 | Franke et al. | 106/154.1 |
| 5,766,529 | 6/1998 | Franke et al. | 264/143 |
| 5,797,984 | 8/1998 | Billmers et al. | 127/33 |

FOREIGN PATENT DOCUMENTS

| | | | |
|---|---|---|---|
| 0 400 532 A1 | 12/1990 | European Pat. Off. | C08L 23/08 |
| 0 544 234 A1 | 2/1993 | European Pat. Off. | C08B 30/12 |
| 0 587 078 A1 | 3/1994 | European Pat. Off. | C08J 9/12 |
| 0 712 883 A1 | 5/1996 | European Pat. Off. | C08J 9/00 |

*Primary Examiner*—Patrick D. Niland
*Attorney, Agent, or Firm*—Karen G. Kaiser, Esq.

[57] ABSTRACT

A biodegradable expanded starch product having low bulk density of less than 0.45 lb/ft$^3$ and low dustiness of less than 1.0% at 10% relative humidity and 23° C. comprising:

a) modified starch having an amylose content of about 10 to 30% by weight and modified with about 2 to 6% by weight of bound alkylene oxide having 2 to 4 carbon atoms, and b) from about 8 to 15% by weight of hydrolyzed polyvinyl alcohol based on the weight of starch and having a degree of hydrolysis of from about 88 to 99%.

20 Claims, No Drawings

BIODEGRADABLE EXPANDED STARCH PRODUCTS AND THE METHOD OF PREPARATION

BACKGROUND OF THE INVENTION

This invention relates to biodegradable expanded or foamed starch products including packaging products having low bulk density and low dustiness properties and further to the method of preparing such products.

Starch, a readily available biodegradable material has been used to prepare foamed, film and other shaped products for different purposes. Some of these starch products and their uses are described in U.S. Pat. Nos. 5,035,930 and 5,043,196 both issued to N. Lacourse et al on Jul. 30, 1991 and Aug. 27, 1991 respectively, showing the extrusion of starch having high amylose content of at least 45% by weight into expanded packaging products. U.S. Pat. No. 5,095,054 issued to G. Lay et al on Mar. 10, 1992 discloses thermoplastic polymer compositions comprising destructurized starch with a variety of thermoplastic polymer materials. These compositions include modified and unmodified starches with polymers such as polyolefins, vinyl polymers, polyacetals, polyesters, polycarbonates, polyethers, etc. The patent further discloses processes for forming such compositions into shaped articles.

In recent years, because of its ready availability and environmentally friendly characteristics, numerous attempts such as those described above, have been made to form starch and its derivatives into different products. Other disclosures include U.S. Pat. No. 5,393,804 issued Feb. 28, 1995 to E. George et al which shows the formation of articles using biodegradable compositions comprising converted or degraded starch of low molecular weight, a plasticizer and alkenol polymers. Another disclosure, EP 0 712 883 published May 22, 1996, reveals the formation of shaped products using starch having a particular particle size. While these methods offer suitable properties for the particular type products they are disclosed for, they generally have not been suitable for applications where the combination of low bulk density as well as good flexibility or low embrittlement is required. This usually occurs where low bulk density starch products are being prepared because such products generally become more brittle as bulk density is reduced. This is especially true in providing products for packaging applications such as loosefill where products with very low bulk density and good flexibililty or low embrittlement are needed, particularly at low relative humidity when the problem is most pronounced.

SUMMARY OF THE INVENTION

Now it has been found that starch based products having low bulk density and low dustiness or embrittlement are obtained when using selected alkylene oxide modified starches in combination with hydrolyzed polyvinyl alcohol.

More particularly, this invention is directed to a biodegradable expanded product having low bulk density of less than 0.45 lb./ft.$^3$ and low dustiness of less than 1.0% at 10% relative humidity and 23° C. comprising:
  a) modified starch having an amylose content of about 10 to 30% by weight and modified with about 2 to 6% by weight of bound alkylene oxide having 2 to 4 carbon atoms, and
  b) from about 8 to 15% by weight of hydrolyzed polyvinyl alcohol, based on the weight of starch, having a degree of hydrolysis of from about 88 to 99%.

This invention further relates to the method of preparing the expanded products described above wherein the composition comprising modified starch and hydrolyzed polyvinyl alcohol is extruded in the presence of 17 to 25% total moisture content.

DETAILED DESCRIPTION OF THE INVENTION

A biodegradable, low bulk density, low dustiness or low embrittlement product is provided in accordance with this invention by expanding a selected modified starch in combination with hydrolyzed polyvinyl alcohol.

The starch material used in this invention may be any of several starches, native or converted and having an amylose content of about 10 to 30% by weight. This includes starch obtained from plant sources such as corn, potato, tapioca, wheat, rice, sago, and sorghum and preferably corn and tapioca.

The starch material that is used in this invention is modified by etherification with alkylene oxide, particularly those containing 2 to 4 and preferably 3 carbon atoms or propylene oxide. The amount of modification is important and more particularly from about 2 to 6% by weight of bound alkylene oxide and preferably from about 3 to 5% of bound alkylene oxide is used.

The polyvinyl alcohol component used in this invention is hydrolyzed and more particularly partially to fully hydrolyzed. Polyvinyl alcohol is a well known, commercially available product prepared by the hydrolysis of polyvinyl acetate. It is typically available in grades defined as partially hydrolyzed to fully or super hydrolyzed and having a degree of hydrolysis of from about 88 to 99%. The preferred polyvinyl alcohol is fully hydrolyzed having a degree of hydrolysis of from about 97.5 to 98.9%. The viscosity of the polyvinyl alcohol will vary with the molecular weight, and is measured in centipoise of a 4% aqueous solution at 20° C. The useful viscosity range is from about 2 to 50 and preferably in the higher range of about 25 to 50 centipoise. This higher range typically relates to a weight average molecular weight of about 130,000 to 180,000, grams per mole. The amount of polyvinyl alcohol used will be from about 8 to 15% and preferably about 10 to 12% by weight, based on the weight of starch.

The expanded or foamed products of this invention having low bulk density and low dustiness or low embrittlement are prepared by extrusion of the selected composition of modified starch and hydrolyzed polyvinyl alcohol as defined herein. In carrying out the extrusion process, it is important that the total moisture content of the starch material in the extruder be at a level of about 17 to 25% by weight and preferably about 18 to 22% by weight, based on the dry weight of starch material. Total moisture or water content is defined to include the residual moisture in the dried starch, absorbed moisture from the atmosphere and water fed to the extruder. The temperature in the extruder during processing will generally range from about 100 to 250° C. and more particularly from about 150 to 200° C. In preparing the expanded loosefill products of this invention, the extrusion may be carried out using a die near the extruder discharge end and having a die pressure of from about 400 to 2000 and preferably 750 to 1200 psi.

In order to better facilitate the processing of the starch composition and formation of a product with the desired properties of low bulk density and low embrittlement, a nucleating agent may desirably be added to the feed material. The use of a nucleating agent is helpful in improving the cell structure as well as other desired properties in the expanded product. Various nucleating agents may be used in preparing the expanded starch products of this invention. Such agents include any inorganic salt or mixtures thereof and especially alkali metal or alkaline earth metal salts such as sodium sulfate, sodium chloride, and magnesium silicate (talc). Also useful are the oxides of such metals, e.g., magnesium oxide and barium oxide. Aluminum containing products such as alumina and aluminum silicate and silica, all found in clay, may also be used as well as titanium products such as titania. The preferred nucleating agents are sodium sulfate and talc. The nucleating agent may be used in amounts of about 0.05 to 1.5% by weight and preferably from about 0.1 to 0.5% by weight, based on the weight of starch. The use of nucleating agent is in addition to any residual salt which may be present in the starch. This includes residual salts such as sodium sulfate and sodium chloride. The total of residual salt plus nucleating agent in the starch feed material will be from about 0.5 to 1.5 and preferably from about 0.75 to 1.25% by weight, based on the weight of starch.

Another characteristic of the starting material which can aid in the extrusion processing as well as the resulting properties of the expanded products is the starch feed particle size. A starch feed particle size of from about 400 to 1600 microns and more particularly from about 600 to 1200 microns has been found to help in processing and provides a uniform closed cell structure. In order to obtain starch feed material having such particle size, a method known as compact granulating, commonly referred to as chilsonating, may be used.

The expanded products of this invention comprising selected modified starch in combination with hydrolyzed polyvinyl alcohol have good flexibility and strength properties. A particularly desirable property in the formed product is the very low embrittlement it exhibits as evidenced by low dustiness of less than 1.0% at low relative humidity (10%). Another desired and surprising property is the very low bulk density (<0.45 lb./ft$^3$) which the formed products exhibit. These combined properties plus the uniform closed cell structure which the expanded products possess make them useful in a variety of applications and especially packaging applications such as loosefill. Loosefill is a packaging material, filler, insert or packing element whose purpose is to provide resiliency or an ability to absorb impact loads or vibrational energies. The loosefill material should be free flowing and fill any voids so that the contents of the package are immobilized and cushioned.

This invention is further illustrated by the following examples with all parts and percentages given by weight and all temperatures in degrees Celsius unless otherwise noted.

The following procedures were used to determine the characteristic properties of the material being evaluated as specified throughout the specification and claims.

BULK DENSITY TEST

The bulk density of the expanded loosefill products of this invention were determined as follows. The expanded loosefill material was placed in a stainless steel beaker (Ohauss series 800). The beaker with material was then weighed using a triple beam balance (Ohauss series 800) which measures directly in lbs/ft$^3$.

DUST TEST

The amount of dust for the expanded loosefill material under specified conditions was determined as follows:

1. The expanded loosefill material to be tested was conditioned in a humidity chamber set at 10% relative humidity (RH) and 23° C. for a 48 hour time period;
2. Approximately 15.0 g of the conditioned loosefill material was added to a 1 gallon steel paint can. This can had been modified such that there were wire mesh screens 1.5" from the top and bottom of the can. The mesh openings are diamond shaped with a width of 5 mm and length of 10 mm. The can comes apart in the middle to facilitate the addition of the expanded or loosefill material and is held together by a gasket:
3. The paint can was placed on a paint can shaker (Red Devil 5400 paint mixer) and shaken for 30 minutes;
4. The expanded material was separated from the dust and then weighed and the percent (%) dust determined using the following formula:

$[(W_{i-wf})/W_i] \times 100 = \%$ dust by weight where:
$W_i$ is the initial weight of the expanded material before shaking, and
$W_f$ is the final weight of the expanded material after shaking.

EXAMPLE I

A sample of corn starch modified with 3% by weight of bound propylene oxide (PO) and containing about 9.9% of fully hydrolyzed polyvinyl alcohol (PVA) (Airvol 325 available from Air Products and Chemicals Inc.) was extruded in a twin screw, 65 mm diameter APV Baker extruder. Moisture was added to the extruder to bring the total moisture of the starch to about 20% and additionally about 0.29% by weight of talc was added as a nucleating agent (the starch feed material contained about 0.98% of residual sodium sulfate). The bulk density of the expanded product as well as the % dustiness at 10% relative humidity and 23° C. was measured using procedures described earlier and are shown in the following table. Comparative samples were made using corn starch, one sample without the polyvinyl alcohol and another sample without propylene oxide modification, and the properties of bulk density and % dustiness measured and also shown below in the table.

TABLE

| Sample | Material | Modification % PO | Amount PVA % | Bulk Density lb/ft$^3$ | Dustiness % |
|---|---|---|---|---|---|
| A | Corn starch | 5 | 9.9 | 0.38 | 0.73 |
| B | Corn starch | — | 5 | 0.74 | 67.00 |
| C | Corn starch | 5 | — | 0.92 | 67.00 |
| D | Hylon VII[1] | 5.5 | — | 0.62 | 0.47 |
| E | Hylon VII[1] | 5.5 | 5 | 0.56 | 0.61 |
| F | Wheat starch | — | 20 | 0.55 | 0.5 |

[1]high amylose corn starch containing 70% amylose content

The results show that when using corn starch modified with propylene oxide and fully hydrolyzed polyvinyl alcohol in accordance with this invention (Sample A), a good expanded foam product was formed which exhibited a surprising combination of low bulk density as well as low percent dustiness or low embrittlement. In contrast, when using comparative samples of corn starch, one without propylene oxide modification (Sample B) and one without polyvinyl alcohol (Sample C), both bulk density and the % dustiness were significantly higher and not as attractive as the product prepared using the composition in accordance with this invention. Comparative samples (D and E) were made using a high amylose corn starch, Hylon VII, a product of National Starch and Chemical Company, containing about 70% of amylose content. Both samples were modified with propylene oxide (PO) with sample D containing no polyvinyl alcohol (PVA) and with sample E containing polyvinyl alcohol. While both samples contained relatively low amounts of dustiness, both had significantly higher bulk densities than the products of this invention. Another comparative sample, sample F was made using wheat starch with 20% of polyvinyl alcohol and resulted in a product with good dustiness properties but with high bulk density.

What is claimed is:

1. A biodegradable expanded product having low bulk density of less than 0.45 lb/ft$^3$ and low dustiness of less than 1.0% at 10% relative humidity and 23° C. comprising:
    a) modified starch having an amylose content of from about 10 to 30% by weight and modified with about 2 to 6% by weight of bound alkylene oxide having 2 to 4 carbon atoms, and
    b) from about 8 to 15% by weight of polyvinyl alcohol based on the weight of starch, having a degree of hydrolysis of from about 88 to 99%.

2. The product of claim 1 wherein the starch is selected from the group consisting of corn, and tapioca.

3. The product of claim 2 wherein the starch is modified with about 3 to 5% of alkylene oxide.

4. The product of claim 3 wherein from about 10 to 12% of poylvinyl alcohol is used.

5. The product of claim 4 wherein the alkylene oxide has 3 carbon atoms.

6. The product of claim 5 wherein the polyvinyl alcohol is fully hydrolyzed with a degree of hydrolysis of from about 97.5 to 98.9%.

7. The product of claim I wherein the starch is corn starch.

8. The product of claim 7 wherein the starch is modified with about 3 to 5% of alkylene oxide.

9. The product of claim 8 wherein from about 10 to 12% of polyvinyl alcohol is used.

10. The product of claim 9 wherein the alkylene oxide has 3 carbon atoms.

11. The product of claim 10 wherein the polyvinyl alcohol is fully hydrolyzed with a degree of hydrolysis of from about 97.5 to 98.9%.

12. The product of claim 11 which is a loosefill packaging material.

13. A method of preparing an expanded biodegradable shaped product having low bulk density of less than 0.45 lb/ft$^3$ and low dustiness of less than 1.0% at 10% relative humidity and 23° C. where the composition which comprises:
    a) modified starch having an amylose content of from about 10 to 30% by weight and modified with about 2 to 6% by weight of bound alkylene oxide having 2 to 4 carbon atoms, and
    b) from about 8 to 15% by weight of polyvinyl alcohol based on the weight of starch, having a degree of hydrolysis of from about 88 to 99%;
is extruded at a total moisture content of from about 17 to 25% and at a temperature of from about 100 to 250° C.

14. The method of claim 13 wherein the starch is selected from the group consisting of corn and tapioca.

15. The method of claim 14 wherein from about 0.05 to 1.5% by weight of a nucleating agent, based on the weight of starch, is used.

16. The method of claim 15 wherein the starch is modified with about 3 to 5% of alkylene oxide and from about 10 to 12% of polyvinyl alcohol is used.

17. The method of claim 16 wherein the starch is corn starch.

18. The method of claim 17 wherein the nucleating agent is selected from the group consisting of alkali metal and alkaline earth metal salts and oxides, alumina, aluminum silicate, silica and titania.

19. The method of claim 18 wherein the polyvinyl alcohol is fully hydrolyzed with a degree of hydrolysis of from about 97.5 to 98.9%.

20. The method of claim 19 wherein the product is loosefill packaging material.

* * * * *